US008065715B2

(12) United States Patent
Song (10) Patent No.: US 8,065,715 B2
(45) Date of Patent: Nov. 22, 2011

(54) AUTHENTICATING A USER OF A WIRELESS DATA PROCESSING DEVICE

(75) Inventor: Jaigak Song, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 623 days.

(21) Appl. No.: 12/012,392

(22) Filed: Jan. 31, 2008

(65) Prior Publication Data

US 2009/0199278 A1     Aug. 6, 2009

(51) Int. Cl.
| | |
|---|---|
| G06F 7/04 | (2006.01) |
| G06F 21/00 | (2006.01) |
| G06F 15/173 | (2006.01) |
| H04L 29/06 | (2006.01) |
| H04L 9/32 | (2006.01) |
| H04K 1/00 | (2006.01) |
| H04M 1/66 | (2006.01) |

(52) U.S. Cl. ................ 726/6; 726/5; 713/161; 713/168; 713/182; 380/247; 709/225; 455/410; 455/411

(58) Field of Classification Search .................. 726/6, 5; 713/161, 168, 182; 380/247; 709/225; 455/410, 455/411

See application file for complete search history.

(56) References Cited

U.S. PATENT DOCUMENTS

| | | | |
|---|---|---|---|
| 2003/0061517 A1* | 3/2003 | Mereu et al. | 713/201 |
| 2008/0072037 A1* | 3/2008 | Narayanan et al. | 713/156 |
| 2008/0098464 A1* | 4/2008 | Mizrah | 726/5 |

* cited by examiner

*Primary Examiner* — Aravind Moorthy (57) ABSTRACT

A system and method for authenticating a user with a wireless data processing device. For example, a method according to one embodiment of the invention comprises: generating a new authentication code for a user at a data service, the data service communicatively coupled to a wireless device over a wireless network and to a client data processing device over a data network; transmitting the new authentication code to the wireless device; receiving a request from the user to connect to the service through the client data processing device over the data network; requesting the new authentication code from the user over the data network; receiving an authentication code entered by the user on the client data processing device over the data network; comparing the new authentication code with the authentication code entered by the user on the client data processing device; allowing access to resources on the service if the authentication code entered by the user matches new the authentication code; and denying access to resources on the service if the authentication code entered by the user does not match the new authentication code.

12 Claims, 4 Drawing Sheets

AUTHENTICATING A USER OF A WIRELESS DATA PROCESSING DEVICE

TECHNICAL FIELD

This application relates generally to the field of data processing systems and more particularly to dynamically changing service characteristics based on device and network connectivity attributes.

BACKGROUND

1. Wireless Data Processing Devices and Networks

The use of wireless devices has become an increasing part of everyday life. Wireless devices have become popular due to their portability, convenience and ease of use. Today, wireless devices offer a myriad of functions including telephony functions, location services, email, multimedia playback, and electronic calendaring, to name a few. Integrated circuit technology has allowed for the miniaturization of circuits into smaller and smaller form factors; allowing for additional functionality and services to become available on wireless devices. Additionally, decreasing memory sizes have permitted wireless devices to store larger and larger amounts of information. As a result, wireless networks are rapidly expanding bandwidth and services to accommodate this increase in wireless information and functionality.

2. Secure Authentication

Various techniques exist for authenticating users on networks. For example, many networks require a user to enter a user name and password to gain access to network resources. A more secure and more complex mechanism for user authentication is accomplished with a "SecureID" card. The SecureID card generates an authentication code at periodic intervals (e.g., 30 or 60 seconds) using a built-in clock and the card's factory-encoded random key (referred to as a "seed") which is different for each SecureID card. A user authenticating to a network resource such as a server or a firewall needs to enter both a personal identification number and the authentication code being displayed at that moment on their RSA SecurID token. The server or other network resource has a real-time clock synchronized with the built-in clock of the SecureID card. The server checks the authentication code against what the user entered, and makes the decision to allow or deny access.

One problem with SecureID authentication is that users are required to continually carry around a SecureID card in order to gain access to network resources. Moreover, SecureID cards are relatively complex and costly.

Accordingly, what is needed is a less costly and burdensome alternative to SecureID authentication.

SUMMARY

A system and method are described for authenticating a user with a wireless data processing device. For example, a method according to one embodiment of the invention comprises: generating a new authentication code for a user at a data service, the data service communicatively coupled to a wireless device over a wireless network and to a client data processing device over a data network; transmitting the new authentication code to the wireless device; receiving a request from the user to connect to the service through the client data processing device over the data network; requesting the new authentication code from the user over the data network; receiving an authentication code entered by the user on the client data processing device over the data network; comparing the new authentication code with the authentication code entered by the user on the client data processing device; allowing access to resources on the service if the authentication code entered by the user matches new the authentication code; and denying access to resources on the service if the authentication code entered by the user does not match the new authentication code.

BRIEF DESCRIPTION OF THE DRAWINGS

A better understanding of authenticating a user of a wireless data processing device can be obtained from the following detailed description in conjunction with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Figure 1:
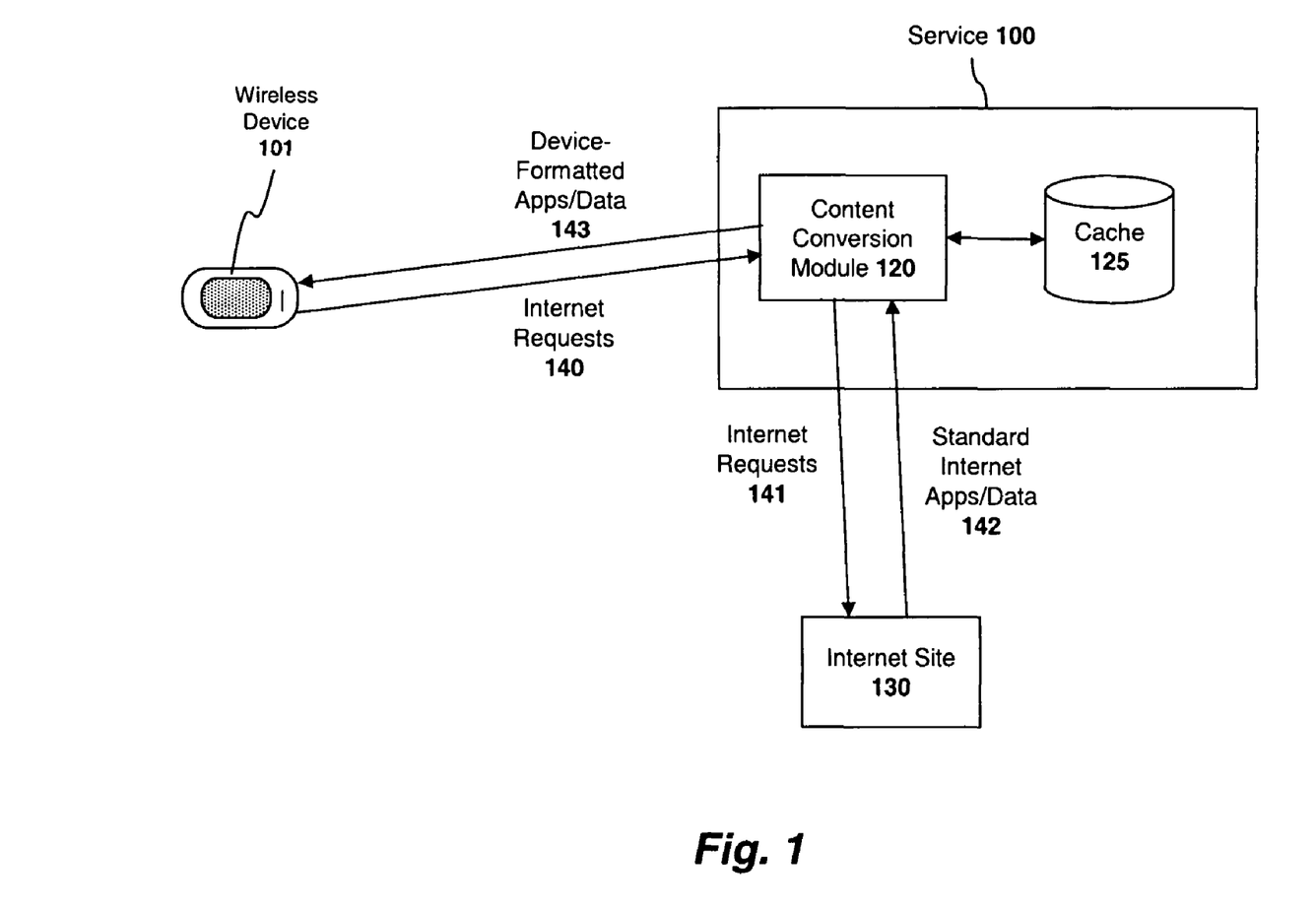
FIG. 1 illustrates a system that includes a service communicating with a data processing device.

Embodiments of the invention may be implemented on a wireless device 101 which communicates with a data processing service 100 as illustrated generally in FIG. 1. Embodiments of a service 100 and data processing device 101 are described, for example, in U.S. Pat. No. 6,721,804 entitled NETWORK PORTAL SYSTEM, APPARATUS AND METHOD, Ser. No. 09/714,897, filed Nov. 15, 2000, which is assigned to the assignee of the present application and which is incorporated herein by reference. Certain features of the service 100 will now be described followed by a detailed description of a system and method for dynamically changing service characteristics based on device and network connectivity attributes. As an initial matter, however, it should be noted that the specific data processing device and system architecture described in U.S. Pat. No. 6,721,804 are not required for implementing the underlying principles of the invention. Rather, the embodiments of the invention described below may be implemented on virtually any type of data processing device including standard personal computers, personal digital assistants and wireless telephones.

In one embodiment, the service 100 converts standard applications and data into a format which each data processing device 101 can properly interpret. Thus, as illustrated in FIG. 1, one embodiment of the service 100 includes content conversion logic 120 for processing requests for Internet content 140. More particularly, the service 100 acts as a proxy for the data processing device 101, forwarding Internet requests 140,141 to the appropriate Internet site 130 on behalf of the data processing device 101, receiving responses from the Internet site 130 in a standard Internet format (e.g., Web pages with embedded audio/video and graphical content, e-mail messages with attachments, . . . etc), and converting the standard Internet responses 124 into a format which the data processing device 101 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 101. As described above, in one embodiment, the bytecodes may be Java bytecodes/applets. However, the conversion logic 120 may generate various other types of interpreted and/or non-interpreted code, depending on the particular type of data processing device 101 being used (e.g., one with an interpreter module or one without).

Because one embodiment of the service 100 maintains an intimate knowledge of the capabilities/configuraten of each data processing device 101 (e.g., screen size, graphics/audio capabilities, available memory, processing power, user preferences, . . . etc) it can reconstruct the requested Internet content accurately, while at the same time minimizing the bandwidth required to transmit the content to the device 101. For example, the conversion logic 120 may perform pre-scaling and color depth adjustments to the requested content so that it will be rendered properly within the data processing device's 101's display. In making these calculations, the conversion may factor in the memory and processing power available on the data processing device 101. In addition, the conversion logic 120 may compress the requested content using a variety of compression techniques, and thereby preserve network bandwidth.

Figure 2:
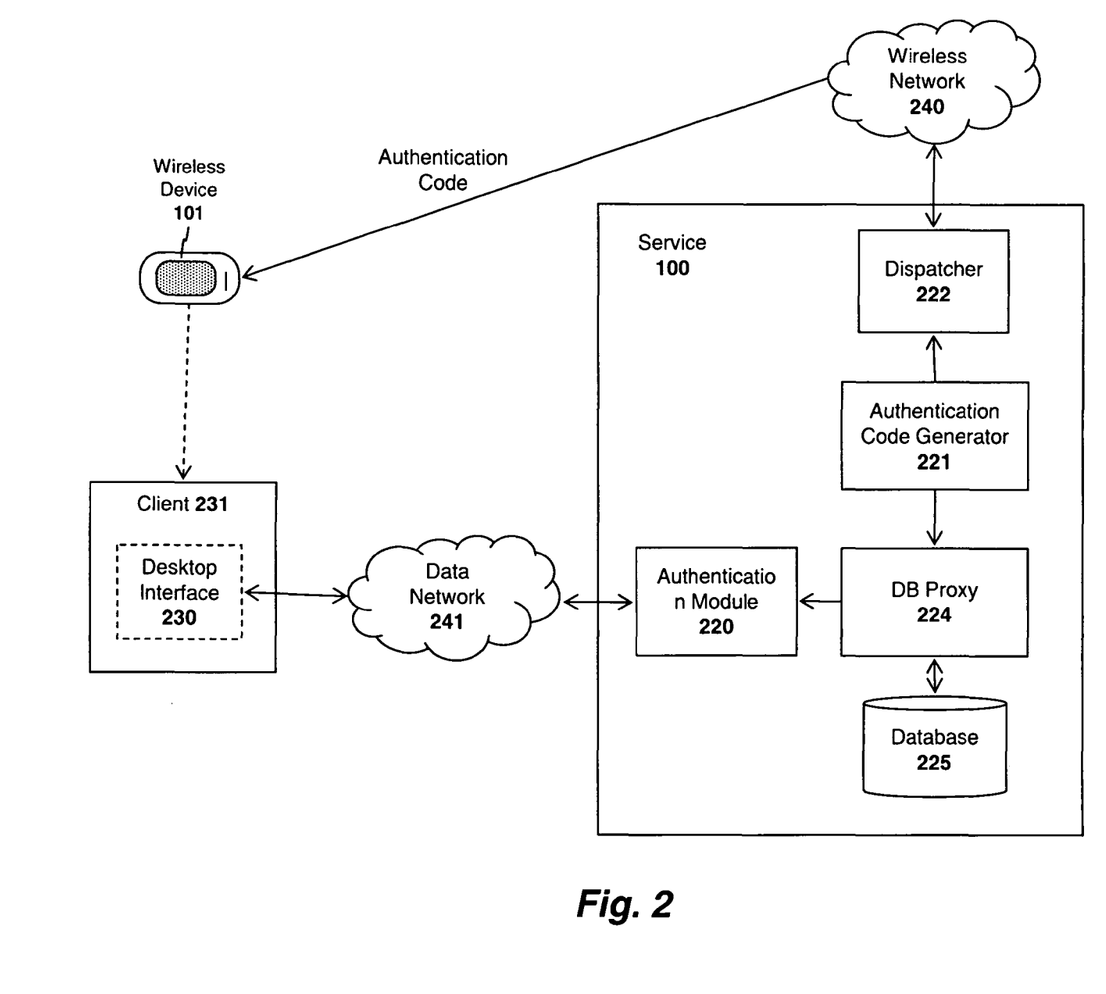
FIG. 2 illustrates a system architecture according to one embodiment of the invention.

System and Method for Performing Securely Authenticating a User of a Data Processing Device FIG. 2 illustrates one embodiment of a system for securely authenticating a user with a data processing device through a data service 100. The data service 100 according to one embodiment of the invention includes a dispatcher 222 for maintaining a connection with a wireless device 101 over a wireless network 240. The dispatcher 222 forms the central point of communications for data transmitted between the wireless device 101 and the service 100. In one embodiment, the dispatcher 222 maintains socket connections (e.g., TCP sockets) between the wireless device 101 and the various servers maintained on the service 100. For example, the dispatcher 222 establishes and maintains socket connections between the wireless device 101 and other components of the service 100 including an authentication code generation module 221 and a database proxy 224 coupled to a user database 225. Each time a user logs in or out of the service 100, the dispatcher 222 notifies the DB proxy 224 to update the user's online status within the user database 225. In addition, given the significant differences in bandwidth between the wireless network 240 and the local network on which the service 100 operates, the dispatcher 222 temporarily buffers data transmitted to and from the wireless device 101 over each individual socket connections. Embodiment of the dispatcher 222, database proxy 224 and user database 225 are described in U.S. Pat. No. 7,162,513, entitled APPARATUS AND METHOD FOR DISTRIBUTING ELECTRONIC MESSAGES TO A WIRELESS DATA PROCESSING DEVICE USING A MULTI-TIERED QUEUING ARCHITECTURE; and the co-pending application entitled SYSTEM AND METHOD FOR SYNCHRONIZING EMAIL MESSAGES BETWEEN AND EXTERNAL EMAIL SERVER, A LOCAL EMAIL SERVER AND/OR A WIRELESS DATA PROCESSING DEVICE, Ser. No. 11/789,516, Filed Apr. 24, 2007. The foregoing U.S. patent and patent application are assigned to the assignee of the present application and are incorporated herein by reference.

In one embodiment of the invention, an authentication module 220 provides user authentication services for users connecting to the service 100 via a desktop interface 230 on a client computer 231. The client computer 231 is connected to the service 200 over a data network 241 such as the Internet. In one embodiment, the desktop interface 230 comprises a Java applet (or other type of applet or application) executed within the context of a Web browser such as Internet Explorer®. However, the underlying principles of the invention are not limited to any particular client-side implementation.

In one embodiment, the authentication code generator module 221 periodically generates new authentication codes for the user of the wireless device 101 and stores the authentication codes within the user database 225 via the DB proxy 224. In one embodiment, different authentication codes are randomly generated for each user (e.g., using a random number generator) and associated with each user within the user database 225. In addition, once the authentication codes are generated, the authentication code generator 221 transmits the authentication codes to the wireless device 101 via the dispatcher 222 and wireless network 240.

Various different time periods for generating new authentication codes may be used while still complying with the underlying principles of the invention (e.g., every minute, hour, day, week, etc). Moreover, in one embodiment, the frequency with which the authentication code generator 221 generates new authentication codes depends on the current load on the service 100. For example, if the service 100 is heavily loaded with connected users, then new authentication codes may be generated relatively less frequently than if the service 100 is not heavily loaded.

In operation, when a user initially connects to the service 100 through the desktop interface 230 of a client computer 231, the service generates a Web page with at least one field for the current authentication code (or some derivative of the code). The user retrieves the current authentication code from the wireless device 101 (the authentication code having been previously received from the authentication code generator) and enters the authentication code in the data field. The Web page may also include data fields for a user name, password and/or other types of user authentication data. In response to the user selecting a "login" button (or other type of user interface element), the authentication code entered by the user is transmitted to the authentication module 220 on the service. The authentication module 220 then looks up the current authentication code associated with the user in the user database 225 and compares the current authentication code from the database with the authentication code entered by the user. If the codes match, then the authentication module 220 logs the user in to the service 100, thereby allowing the user to access his/her data. If the codes do not match, then the authentication module 220 generates a login failure which is transmitted to the desktop interface 230.

In one embodiment, the authentication code generator 221 generates a new authentication code dynamically (rather than periodically) in response to a user accessing the service via the client computer 231. Thus, in this embodiment, the user initially identifies him/herself to the service 100 using, for example, a user name and/or password. In response, the authentication code generator 221 dynamically generates a new authentication code and transmits the new authentication code to the wireless device 101. The user then reads the authentication code from the display of the wireless device 101 and provides the authentication code to the authentication module 220 via the desktop interface 230 to complete the authentication process.

In another embodiment, authentication codes may be generated both periodically and dynamically. For example, the authentication code generator 221 may periodically generate new authentication codes for each user if the service 100 is not heavily loaded with connected users. In this case, the current authentication code will be readily available on the user's wireless device 101 when the user initially connects to the service. However, if the service becomes heavily loaded (e.g., due to a number of users above a specified threshold), then the authentication code generator may only generate new authentication codes in response to users attempting to log in via client computers 231 (as described above).

In one embodiment, the user is not required to manually enter the authentication code via the desktop interface 230. Rather, in this embodiment, the wireless device 101 communicates the authentication code to the desktop interface 230 over a communication link such as, for example, a Bluetooth link, a universal Serial Bus link or a WiFi link (e.g., an 802.x link). Various other communication standards may be used to connect the wireless device to the client computer 231 while still complying with the underlying principles of the invention.

Figure 3:
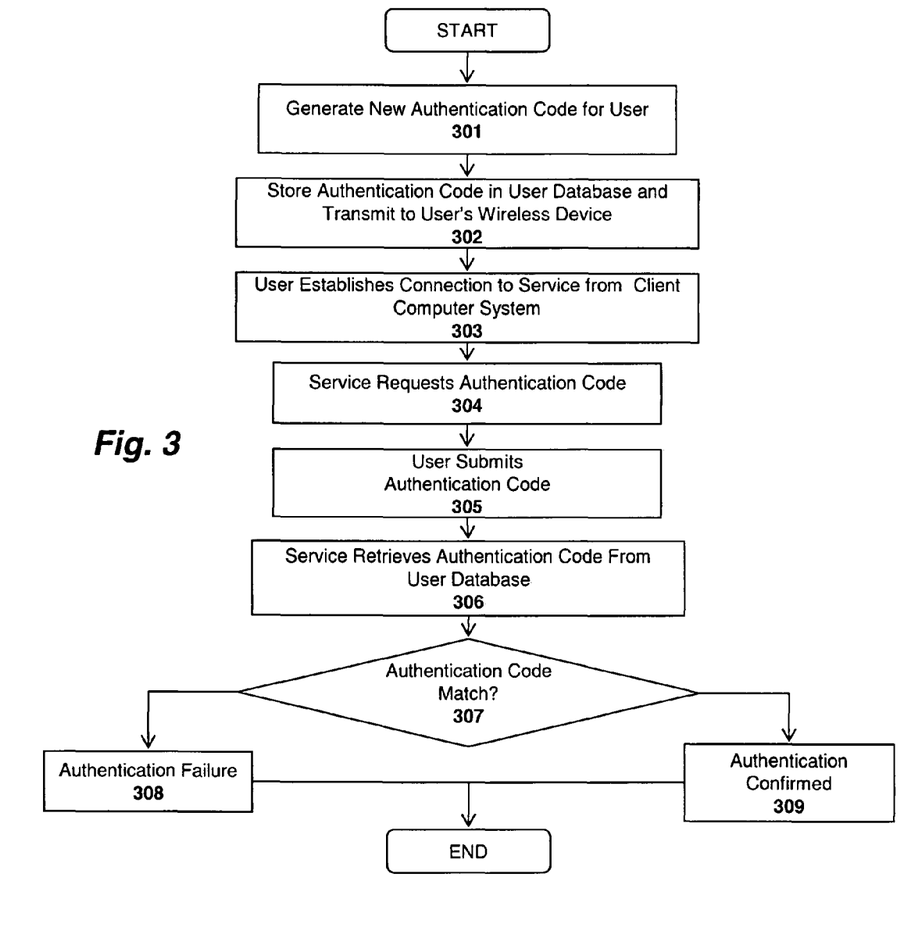
FIG. 3 illustrates a method according to one embodiment of the invention.

A method according to one embodiment of the invention is illustrated in FIG. 3. At step 301, the service 100 generates a new authentication code for a user, either dynamically, in response to user input, or periodically (as described above). At step 302, the authentication code is stored in the user database on the service 100 and transmitted over the wireless network 240 to the wireless device 101. At step 303, the user initially establishes a connection to the service 100 from the client computer system 231. At 304 the service 100 requests the authentication code from the user (e.g., in the form of a Web page with a data field for the authentication code). At step 305 the user provides the authentication code to the service 100. At step 306, the service retrieves the authentication code from the user database 306 and compares the authentication code from the database with the authentication code provided by the user. If the authentication codes match, determined at step 307, then at 309 the user is authenticated and provided with access to the service. If, however, the authentication codes do not match, then an authentication failure occurs at 308. The service may then transmit a notification of the failure to the user and may provide the user with the opportunity to re-enter the authentication code.

Figure 4:
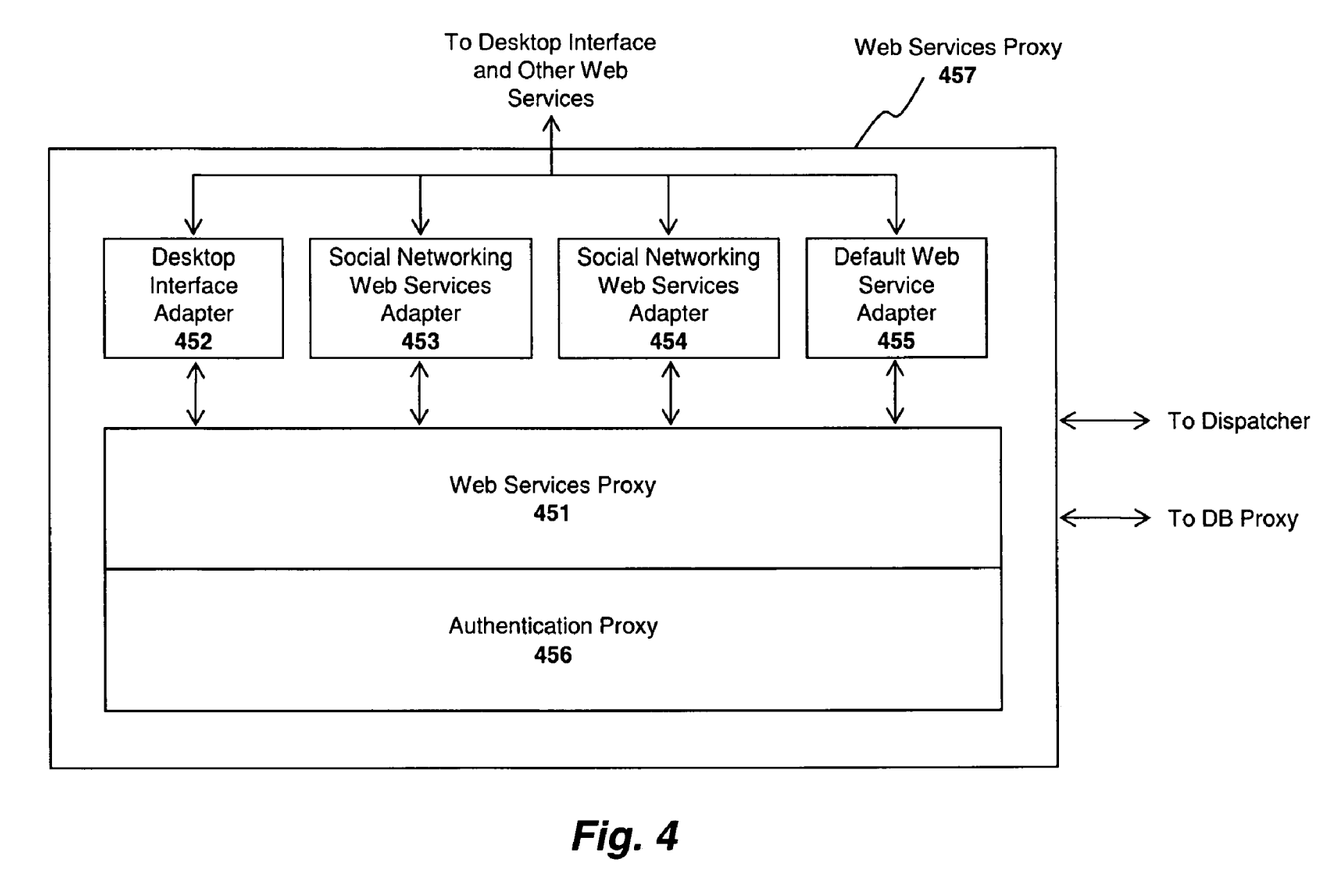
FIG. 4 illustrates a system architecture employed in one embodiment of the invention.

In one embodiment, the desktop interface module 230 is linked to the service 100 through an adapter-based Web services interface such as the one described in the co-pending U.S. application entitled SYSTEM AND METHOD FOR PROVIDING WEB SERVICES FOR WIRELESS COMMUNICATION DEVICES, Ser. No. 11/653,661, Filed Jan. 12, 2007, which is assigned to the assignee of the present application and which is incorporated herein by reference. In particular, as illustrated in FIG. 4, in one embodiment, the desktop interface module 230 communicates with the service through a desktop interface adapter 452. FIG. 4 also illustrates one embodiment of a Web Service integration proxy 457 employed within the service 100. In the illustrated embodiment, the Web Service integration proxy 457 includes a "local" Web Services proxy 451 (i.e., "local" in this sense that it runs on the service 100), a plurality of Web Services adapters 452-455 communicably connected to the Web Services proxy 451, and an authentication proxy 456 for performing the authentication operations described herein.

Certain Web Services exchange information with clients and servers on the Internet using various protocols and encodings, for example the Simple Object Access Protocol (SOAP). SOAP is a message-based protocol which employs an XML syntax to send text commands across the Internet using the Hypertext Transport Protocol (HTTP). Other Web Services protocols such as XML/RPC and REST ("Representational State Transfer") may also be used consistent with the underlying principles of the invention.

Although most Web Services use these standard protocols, many Web Services employs their own specific format (e.g., data schema and rules for communication) which must be followed in order to communicate with those Web services. In addition, each Web service employs its own unique API, i.e., the set of functions and interfaces exposed by the Web service. Thus, in one embodiment of the invention, a separate Web Services adapter 452-455 is used to communicate with Web Services proxies and client-based Web services programs (e.g., desktop interface 230) using the formats require by those proxies/programs. In addition, as illustrated in FIG. 3b, one embodiment of the invention includes a "global" or "default" Web Services adapter 355 for communicating with web services using standardized (i.e., non-proprietary) Web Services communication formats.

The Web Services adapters 452-455 are "plugged in" to the Web Services Proxy 451 through an API exposed by the Web Services Proxy 451. Each of the Web Services adapters 452-455 exchange data and program code with the Web Services Proxy Web Services proxy via this API.

In operation, each adapter 452-455 communicates with a particular Web Service or program (e.g., the desktop interface 230) using the data schema required by that Web service or program. The adapter provides the data to the Web Services proxy 451 via the Web Services proxy API. In one embodiment, the adapter 452-455 may also convert the data into a format interpretable by the Web Services proxy 451. The Web Services proxy 451 extracts the underlying data and encapsulates the data into the communication format required for communicating to the wireless device 101. If the wireless device is currently online, then the dispatcher 222 to which the wireless device is currently connected transmits the data to the wireless device using an asynchronous protocol specifically adapted for transmission over high-latency networks (e.g., wireless networks). For upstream communication, when the user of the wireless device 101 transmits information to the Web Service or program, the information is transmitted through the dispatcher 222 using the same protocol. The Web Services proxy 451 extracts the information and communicates the information to the appropriate Web Services adapter via the Web Service proxy API. The Web Services adapter then communicates the new information to its associated Web Service or program using the required data schema and other communication standards required by the Web Service or program.

One notable benefit of this architecture is that if a particular Web Services proxy or program (e.g., the desktop interface 230) modifies its communication standards/protocol, then only the specific adapter for that web services proxy needs to be modified or replaced. The remaining software executed on the Web Services Proxy 457 and each of the wireless devices 101 does not need to be changed. Thus, the network bandwidth, as well as the engineering time which would normally be required to upgrade each individual wireless device 310 is conserved.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments described above are limited to a wireless implementation, the underlying principles of the invention may be employed in a variety of different types of networks. Similarly, while the protocol stack described above is implemented using Java, the underlying principles of the invention are not limited to any particular programming language.

Accordingly, the scope and spirit of the invention should be judged in terms of the claims which follow.

What is claimed is:

1. A method comprising:
generating, by an authentication code generator, an authentication code for a user at a data service, the data service communicatively coupled to a wireless device over a wireless network and to a client data processing device over a data network, the authentication code generator configured to periodically generate authentication codes when a number of client data processing devices connected to the data service is low and to dynamically generate the authentication codes in response to the user logging on to the data service when the number of client data processing devices connected to the data service is high, wherein a frequency with which the authentication codes are periodically generated is based at least in part on the number of client data processing devices connected to the data service;
transmitting the authentication code to the wireless device when the authentication code is generated at the data service;
receiving a request from the user to connect to the data service through the client data processing device over the data network;
requesting a new authentication code from the user over the data network, the new authentication code comprising the authentication code most recently transmitted to the wireless device;
receiving a user-entered authentication code from the client data processing device over the data network;
comparing the new authentication code with the user-entered authentication code;
allowing access to resources on the service if the user-entered authentication code matches the new authentication code; and
denying access to resources on the service if the user-entered authentication code does not match the new authentication code.

2. The method as in claim 1 further comprising:
storing the authentication codes within a user database on the service, the authentication codes associated with the user within the user database; and
identifying the user upon receiving the request from the user to connect to the service through the client data processing device over the data network; and
subsequently reading the new authentication code from the user database with the identity of the user prior to said requesting the new authentication code from the user.

3. The method as in claim 1 wherein the authentication codes are automatically communicated over a communication channel from the wireless device to the client data processing device.

4. The method as in claim 1 wherein the service comprises a Web service for communicating with the client data processing device over the data network.

5. A system for authenticating a user with a wireless data processing device comprising:
at least a memory and a processor to implement:
an authentication code generator configured to generate authentication codes for a user at a data service, the data service communicatively coupled to a wireless device over a wireless network and to a client data processing device over a data network, the authentication code generator configured to periodically generate the authentication codes when a number of client data processing devices connected to the data service is low and to dynamically generate the authentication codes in response to the user logging on to the data service when the number of client data processing devices connected to the data service is high, wherein a frequency with which the authentication codes are periodically generated is based at least in part on the number of client data processing devices connected to the data service, the data service configured to transmit the authentication codes to the wireless device when the authentication codes are generated at the data center; and
an authentication module configured to:
receive a request from the user to connect to the data service through the client data processing device over the data network;
request a new authentication code from the user over the data network, the new authentication code comprising an authentication code most recently transmitted to the wireless device;
receive a user-entered authentication code from the client data processing device over the data network;
compare the new authentication code with the user-entered authentication code;
allow access to resources on the service if the user-entered authentication code matches the new authentication code; and
deny access to resources on the service if the user-entered authentication code does not match the new authentication code.

6. The system as in claim 5 further comprising:
a user database for storing the authentication codes on the service, the authentication codes associated with the user within the user database; and
the authentication module:
identifying the user upon receiving the request from the user to connect to the service through the client data processing device over the data network; and subsequently reading the new authentication code from the user database with the identity of the user prior to said requesting the new authentication code from the user.

7. The system as in claim 5 wherein the authentication codes are automatically communicated over a communication channel from the wireless device to the client data processing device.

8. The system as in claim 5 wherein the service comprises a Web service for communicating with the client data processing device over the data network.

9. A machine-readable storage medium having program code stored thereon which, when executed by a machine, causes the machine to perform the operations of:
  generating, by an authentication code generator, an authentication code for a user at a data service, the data service communicatively coupled to a wireless device over a wireless network and to a client data processing device over a data network, the authentication code generator configured to periodically generate authentication codes when a number of client data processing devices connected to the data service is low and to dynamically generate the authentication codes in response to the user logging on to the data service when the number of client data processing devices connected to the data service is high, wherein a frequency with which the authentication codes are periodically generated is based at least in part on a number of client data processing devices connected to the data service;
  transmitting the authentication code to the wireless device when the authentication code is generated at the data service;
  receiving a request from the user to connect to the data service through the client data processing device over the data network;
  requesting a new authentication code from the user over the data network, the new authentication code comprising the authentication code most recently transmitted to the wireless device;
  receiving a user-entered authentication code from the client data processing device over the data network;
  comparing the new authentication code with the user-entered authentication code;
  allowing access to resources on the service if the user-entered authentication code matches the new authentication code; and
  denying access to resources on the service if the user-entered authentication code does not match the new authentication code.

10. The machine-readable storage medium as in claim 9 including additional program code to cause the machine to perform the operations of:
  storing the authentication codes within a user database on the service, the authentication codes associated with the user within the user database; and
  identifying the user upon receiving the request from the user to connect to the service through the client data processing device over the data network; and
  subsequently reading the new authentication code from the user database with the identity of the user prior to said requesting the new authentication code from the user.

11. The machine-readable medium as in claim 9 wherein the authentication codes are automatically communicated over a communication channel from the wireless device to the client data processing device.

12. The machine-readable medium as in claim 9 wherein the service comprises a Web service for communicating with the client data processing device over the data network.

* * * * *

UNITED STATES PATENT AND TRADEMARK OFFICE
CERTIFICATE OF CORRECTION

PATENT NO.        : 8,065,715 B2
APPLICATION NO.   : 12/012392
DATED             : November 22, 2011
INVENTOR(S)       : Jaigak Song It is certified that error appears in the above-identified patent and that said Letters Patent is hereby corrected as shown below:

In column 9, line 12, in Claim 9, after "readable" delete "storage".

In column 10, line 15, in Claim 10, after "readable" delete "storage".

Signed and Sealed this
Twenty-seventh Day of December, 2011

David J. Kappos
*Director of the United States Patent and Trademark Office*